J. M. McGEHEE.
Apparatus for Destroying Animal and Vegetable Life.
No. 151,304. Patented May 26, 1874.

Witnesses:
Chas. Nida
Sedgwick

Inventor:
J. M. McGehee
Per Munn & Co
Attorneys.

UNITED STATES PATENT OFFICE.

JOHN M. McGEHEE, OF MILTON, FLORIDA.

IMPROVEMENT IN APPARATUS FOR DESTROYING ANIMAL AND VEGETABLE LIFE.

Specification forming part of Letters Patent No. 151,304, dated May 26, 1874; application filed August 9, 1873.

*To all whom it may concern:*

Be it known that I, JOHN M. McGEHEE, of Milton, in the county of Santa Rosa and State of Florida, have invented a new and useful Improvement in Apparatus for Destroying Animal and Vegetable Life, of which the following is a specification:

The invention will first be described, and then pointed out in the claim.

Figure 1:
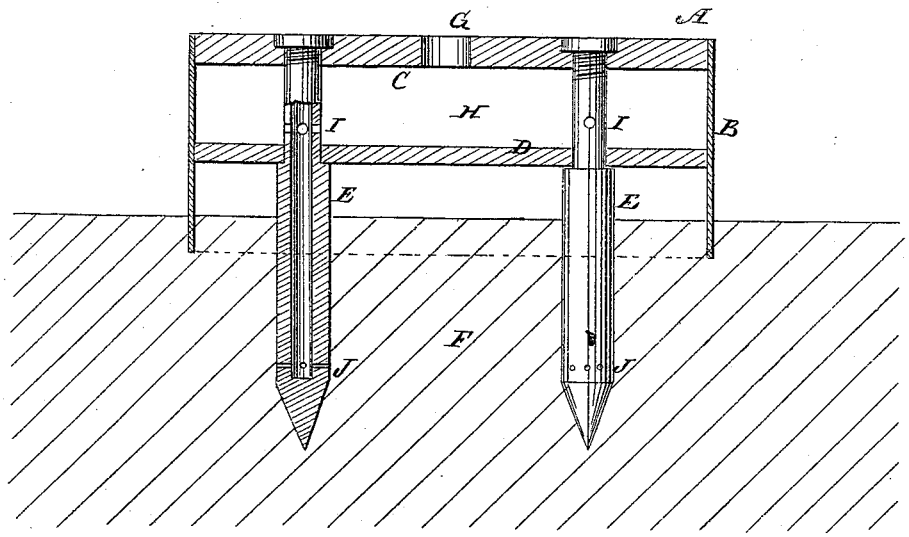
Figure 2:
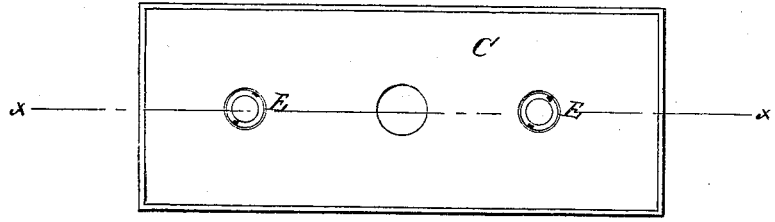

In the accompanying drawing, Figure 1 is a vertical section of the apparatus, seen as applied or in use. Fig. 2 is a top view.

Similar letters of reference indicate corresponding parts.

A represents a box of any suitable size or form, consisting of an outer wall, B, and a top, C, and with or without a horizontal plate, D, and with or without tubes E. F represents the earth. I prefer to make the apparatus with the raised bottom plate D and with the tubes E, one or more, but the box may be placed, as seen, with the edge of the wall B beneath the surface, and by the introduction of steam into the box through the orifice G, animal or vegetable life on the surface, and for a distance beneath the surface, will be destroyed by the heat. For penetrating deeper into the soil I put in one or more tubes, E, which are in communication with the steam-chamber H by means of lateral holes I. These tubes are closed at both ends and sharpened at the bottom, so as to readily penetrate the soil. J represents steam-discharge holes.

There are certain kinds of grass and weeds, as well as grubs, worms, and insects, which penetrate deeply into the soil, and which it is almost impossible to eradicate by the ordinary methods. By the application of heat in the form of steam through my apparatus all life may be destroyed on any given surface.

The box may be moved from place to place, as may be required, and the tubes may be made to penetrate the ground one foot, more or less, according to circumstances.

Having thus described my invention, I claim as new and desire to secure by Letters Patent—

The box having perforated top A G, sides B, and partition D, in combination with the laterally apertured and pointed tubes E, as and for the purpose specified.

JOHN M. McGEHEE.

Witnesses:
F. M. PETERS,
N. W. LONG.